US010411767B2

(12) United States Patent
Zhao et al.

(10) Patent No.: US 10,411,767 B2
(45) Date of Patent: Sep. 10, 2019

(54) SURFACE MOUNTED TYPE NFC ANTENNA AND ANTENNA SYSTEM

(71) Applicants: Shenzhen Sunway Communication Co., Ltd, Shenzhen (CN); Shanghai Sunlinetech Materials Co., Ltd, Shenzhen (CN); KunShan ZhouYuan Electronics. CO., Ltd, Shenzhen (CN)

(72) Inventors: Anping Zhao, Shenzhen (CN); Fuqiang Ai, Shenzhen (CN); Chunlei Liu, Shenzhen (CN); Zhaoguo Yang, Shenzhen (CN)

(73) Assignees: Shenzhen Sunway Communication Co., Ltd, Shenzhen (CN); Shanghai Sunlinetech Materials Co., Ltd, Shenzhen (CN); KunShan ZhouYuan Electronics. CO., Ltd, Shenzhen (CN)

( * ) Notice: Subject to any disclaimer, the term of this patent is extended or adjusted under 35 U.S.C. 154(b) by 0 days.

(21) Appl. No.: 15/507,762

(22) PCT Filed: Oct. 12, 2016

(86) PCT No.: PCT/CN2016/101917
§ 371 (c)(1),
(2) Date: Mar. 1, 2017

(87) PCT Pub. No.: WO2018/068235
PCT Pub. Date: Apr. 19, 2018

(65) Prior Publication Data
US 2019/0020379 A1 Jan. 17, 2019

(51) Int. Cl.
*H04B 5/00* (2006.01)
*H01Q 1/24* (2006.01)
(Continued)

(52) U.S. Cl.
CPC ............ *H04B 5/0081* (2013.01); *H01Q 1/243* (2013.01); *H01Q 1/38* (2013.01); *H01Q 7/06* (2013.01);
(Continued)

(58) Field of Classification Search
CPC ......... H04B 5/0081; H01Q 1/243; H01Q 1/38
(Continued)

(56) References Cited

U.S. PATENT DOCUMENTS

2010/0156729 A1* 6/2010 Kubo ................. G06K 7/10316
343/702
2013/0020394 A1* 1/2013 Koujima .............. H04B 5/0087
235/492
(Continued)

FOREIGN PATENT DOCUMENTS

| CN | 102959800 A | 3/2013 |
|----|-------------|--------|
| CN | 102959800 B | 3/2013 |

(Continued)

*Primary Examiner* — Peguy Jean Pierre
(74) *Attorney, Agent, or Firm* — Westbridge IP LLC

(57) ABSTRACT

Herein disclosed is a surface-mounted NFC antenna, having a small size and good performance, comprising a magnetic core, a first dielectric layer, a first coil and a second coil. The first coil is wound on the outer surface of the magnetic core. One side of the first dielectric layer, away from the magnetic core, is the first surface. The second coil is disposed on the first surface. The tail end of the first coil is electrically connected with the head end of the second coil. In the NFC antenna, the second coil is disposed on the dielectric layer to separate the first coil from the second coil, thereby preventing the magnetic field generated by the first coil from weakening the magnetic field generated by the second coil, so the magnetic field generated by the second coil is relatively larger.

11 Claims, 10 Drawing Sheets

(51) Int. Cl.
*H01Q 7/06* (2006.01)
*H01Q 1/38* (2006.01)

(52) U.S. Cl.
CPC ......... *H04B 5/0031* (2013.01); *H04B 5/0093* (2013.01)

(58) Field of Classification Search
USPC ........................................................ 343/867
See application file for complete search history.

(56) References Cited

U.S. PATENT DOCUMENTS

| | | | | |
|---|---|---|---|---|
| 2013/0229319 A1* | 9/2013 | Miura | ...................... | H01Q 7/06 343/788 |
| 2014/0035793 A1* | 2/2014 | Kato | ...................... | H01Q 1/243 343/867 |
| 2014/0184462 A1* | 7/2014 | Yosui | ...................... | H01Q 7/06 343/788 |

FOREIGN PATENT DOCUMENTS

| | | |
|---|---|---|
| CN | 103620869 A | 3/2014 |
| CN | 105490009 A | 4/2016 |

\* cited by examiner

SURFACE MOUNTED TYPE NFC ANTENNA AND ANTENNA SYSTEM

CROSS-REFERENCE TO RELATED APPLICATIONS

The present application is a national phase filing under 35 U.S.C. 371 of International Application PCT/CN2016/101917.

TECHNICAL FIELD

The present invention relates to the technical field of NFC antennas, in particular to a surface mounted type NFC antenna and an antenna system.

BACKGROUND

Near Field Communication (NFC) is a wireless communication technology which helps electronic devices receive and transmit electromagnetic waves by means of magnetic field induction to perform short-distance communication. The technology can provide consumers with simple and visual information exchange, content access, and services. Due to such characteristic, NFC technology has drawn more and more attention, and has been applied to mobile devices, PCs, smart control units, etc.

For application of traditional NFC hand-held devices, an NFC antenna radiator is generally placed on a battery, and in order to reduce the negative effects of eddy currents on the NFC antenna, which are generated on the battery and are opposite to the current direction of the antenna itself, a ferrite layer which can separate the antenna coil from the battery is placed between the NFC antenna coil and the battery at the same time. To ensure the performance of the NFC antenna, the NFC antenna employing such design solution must meet certain size requirements. The antenna in the traditional NFC antenna solution is relatively large in size and therefore fails to meet the miniaturization demand of hand-held devices.

In order to fulfill the aim of reducing the size of the NFC antenna, Murata Manufacturing Co., Ltd. has put forward a small-sized surface mounted type NFC antenna solution in Chinese Patent CN103620869A, and displayed the specific applications of the solution in actual communication devices in Chinese patent CN102959800B. Compared with the traditional NFC antenna solution, the biggest difference of such solution lies in that the traditional NFC antenna coil with a relatively large size is spirally wound on a ferrite core with a very small size to form a spiral tubular antenna. After the small-sized NFC antenna monomer is placed above and effectively coupled with a metal sheet (or a PCB), an eddy current with a positive effect is generated on the metal sheet to further improve the performance of the whole antenna system (including the surface mounted type NFC antenna and the metal sheet). Compared with the traditional large-sized NFC antenna solution, the NFC antenna solution put forward by Murata Manufacturing Co., Ltd. has made huge progress in the aspect of antenna size. However, such surface mounted type antenna has a defect: when the antenna monomer is placed on the PCB or metal sheet, due to the special winding mode of the antenna coil on the ferrite, the magnetic field generated on the antenna itself is vertical and orthogonal to the magnetic field generated by the effective eddy current which is generated on the metal sheet. Such mutual vertical and orthogonal relationship of the magnetic fields lowers the performance of the whole antenna system.

In order to improve the performance of the NFC antenna, Chinese patent 201610076899.4 discloses an orthogonally wound surface mounted type NFC antenna and an antenna system. The NFC antenna comprises a ferrite core which is formed by superposing a plurality of plate-like ferrite units and extends along the X-Y plane, a first coil and a second coil of the NFC antenna that are orthogonally and annularly wound on the ferrite core, wherein the first coil is spirally wound along the −X axis or +X axis direction; the second coil is spirally wound along the +Z axis or −Z axis in the vertical direction; and the tail end of the second coil is connected with the head end of the first coil. For the orthogonally wound surface mounted type NFC antenna disclosed by the patent, the performance of the NFC antenna is improved to a certain degree through superposition of (B1) and (B2). However, every turn of the second coil is crossed with the first coil, so the horizontal magnetic field generated by the first coil and the vertical magnetic field generated by the second coil perform relatively strong back-coupling which weakens the magnetic field of the second coil. By such configuration mode, the antenna and the metal sheet cannot reach the optimal matched state.

Therefore, it is necessary to make an improvement on the aforementioned surface mounted type NFC antenna and develop a small-sized surface mounted type NFC antenna which has high performance and can be optimally matched with the magnetic field generated by the eddy current which is generated on the metal sheet.

BRIEF SUMMARY

In as first aspect, presented herein is a surface mounted type NFC antenna, comprising a magnetic core; a first dielectric layer; a first coil and a second coil; wherein the first dielectric layer and the magnetic core are superposed, the first coil is wound on the outer surface of the magnetic core, a first surface is one side of the first dielectric layer away from the magnetic core, the second coil is disposed on the first surface, the first coil and the second coil each consist of a head end and a tail end, and the tail end of the first coil is electrically connected with the head end of the second coil.

In some aspects of the surface mounted type NFC antenna, the second coil is disposed on the first surface around the center of the first surface.

In some aspects of the surface mounted type NFC antenna, the number of turns of each of the first coil and the second coil is greater than two.

In some aspects of the surface mounted type NFC antenna, the turns ratio of the second coil to the first coil is 0.2:0.4.

In some aspects of the surface mounted type NFC antenna, the first coil is spirally wound on the magnetic core along the length or width direction of the magnetic core.

In some aspects, the surface mounted type NFC antenna is characterized by also comprising a second dielectric layer and electrodes, wherein the first dielectric layer, the magnetic core and the second dielectric layer are superposed in turn; the electrodes are disposed on one side of the second dielectric layer away from the magnetic core; the electrodes include a first electrode and a second electrode; the tail end of the second coil is electrically connected with the first electrode; and the head end of the first coil is electrically connected with the second electrode.

In some aspects of the surface mounted type NFC antenna, the second dielectric layer is provided with a first through-hole electrode and a second through-hole electrode; the tail end of the second coil is electrically connected with the first electrode through the first through-hole electrode; and the head end of the first coil is electrically connected with the second electrode through the second through-hole electrode.

In another aspect, presented herein is an antenna system, comprising a substrate and a metal sheet, the metal sheet being disposed on the substrate, the antenna system also comprising a surface mounted type NFC antenna, wherein the surface mounted type NFC antenna is disposed on the metal sheet.

In some aspects, the surface mounted type NFC antenna of the antenna system is entirely disposed on the metal sheet.

In some aspects, the surface mounted type NFC antenna of the antenna system is partly disposed on the metal sheet.

DETAILED DESCRIPTION

Figure 1:
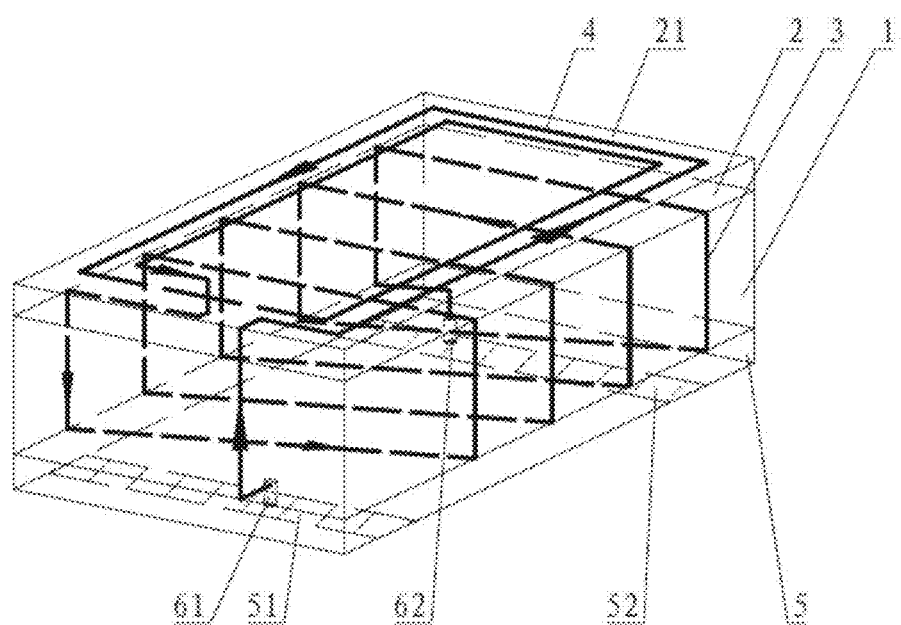
FIG. 1 is a schematic view of an overall structure of a surface mounted type NFC antenna according to an embodiment of the present invention.
Figure 2:
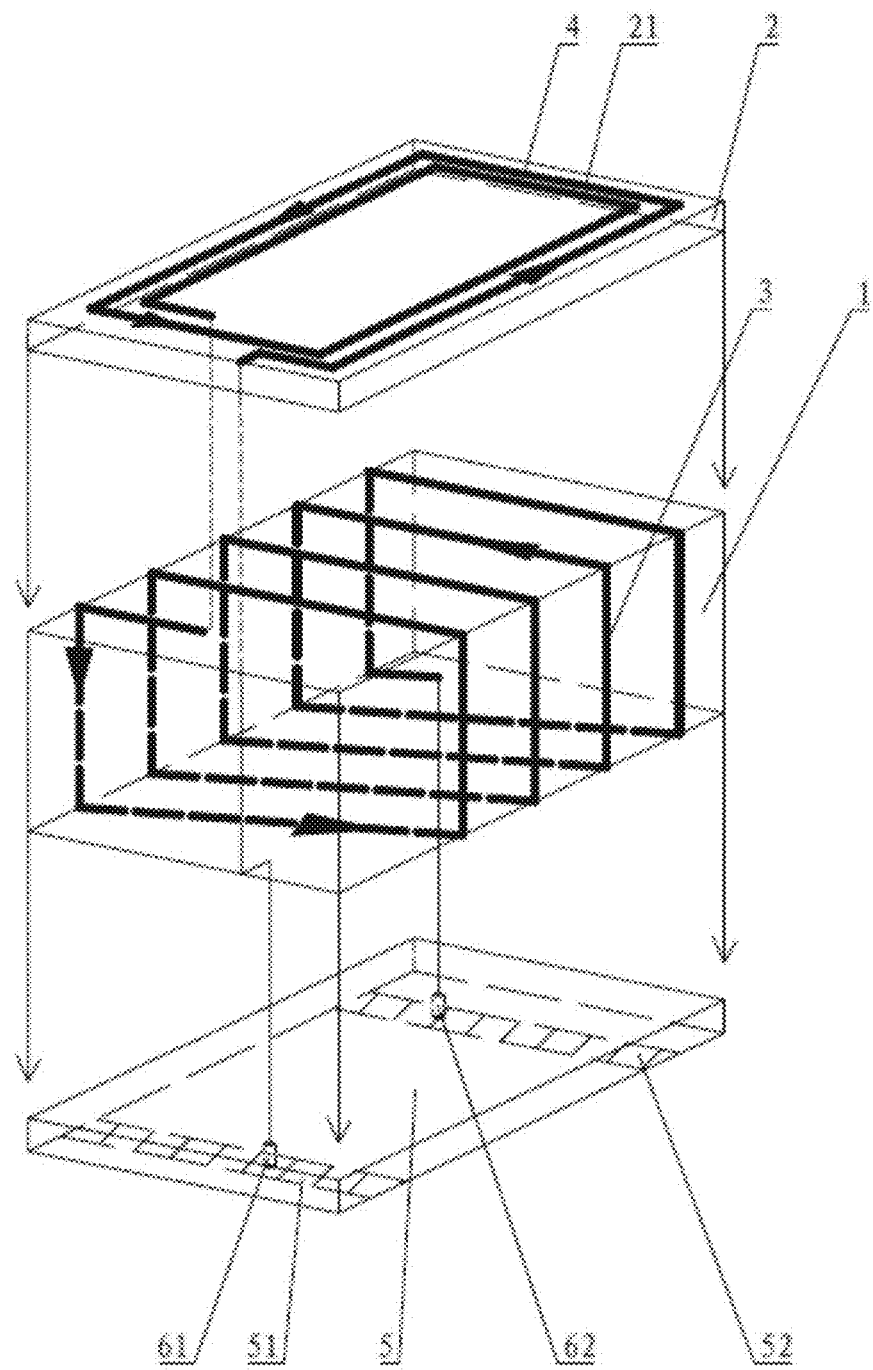
FIG. 2 is a schematic view of an exploded structure of a surface mounted type NFC antenna according to an embodiment of the present invention.

The technical problem to be solved by the present invention is to provide a surface mounted type NFC antenna with a small size and high performance and to further provide an antenna system.

To solve the above mentioned problems, the present invention adopts the following technical solutions:

A surface mounted type NFC antenna includes a magnetic core, a first dielectric layer, a first coil and a second coil. The first dielectric layer and the magnetic core are superposed. The first coil is wound on the outer surface of the magnetic core. One side of the first dielectric layer away from the magnetic core is a first surface. The second coil is disposed on the first surface. The first coil and the second coil each consist of a head end and a tail end. The tail end of the first coil is electrically connected with the head end of the second coil.

An antenna system includes a substrate, a metal sheet and a surface mounted type NFC antenna. The metal sheet is disposed on the substrate. The surface mounted type NFC antenna is disposed on the metal sheet.

The present invention has the following beneficial effects:

(1) The first coil is wound on the outer surface of the magnetic core, and the second coil is disposed on the first dielectric layer which completely separates the first coil from the second coil, so the back-coupling effect between the magnetic field generated by the first coil and the magnetic field generated by the second coil is reduced; the magnetic field generated by the first coil has a relatively small effect on the magnetic field generated by the second coil, so the magnetic field generated by the second coil is not weakened, thus improving the antenna performance.

(2) After the surface mounted type NFC antenna is disposed on the metal sheet, the metal sheet generates an eddy loop due to the existence of the first coil, and the magnetic field generated by the eddy loop on the metal sheet is positively superposed with the magnetic field generated by the second coil, thus improving the performance of the whole antenna system.

Explanation of Marks

Magnetic core (1); first dielectric layer (2); first surface (21); first coil (3); second coil (4); second dielectric layer (5); first through-hole electrode (51); second through-hole electrode (52); first electrode (61); second electrode (62); substrate (7); metal sheet (8).

The technical contents, structural characteristics, fulfilled objective and effects of the present invention are described in detail with reference to the embodiments and attached drawings.

The key concept of the present invention lies in that a second coil is disposed on a first dielectric layer outside a magnetic core such that the back-coupling effect between the first coil and the second coil is small, and thus the performance of the antenna is improved.

Referring to FIGS. 1-7: A surface mounted type NFC antenna includes a magnetic core (1), a first dielectric layer (2), a first coil (3) and a second coil (4). The first dielectric layer (2) and the magnetic core (1) are superposed. The first coil (3) is wound on the outer surface of the magnetic core (1). One side of the first dielectric layer (2) away from the magnetic core (1) is a first surface (21). The second coil (4) is disposed on the first surface (21). The first coil (3) and the second coil (4) each consist of a head end and a tail end. The tail end of the first coil (3) is electrically connected with the head end of the second coil (4).

From the above description it can be known that the present invention has the following beneficial effects: the first coil is wound on the outer surface of the magnetic core, and the second coil is disposed on the first dielectric layer which completely separates the first coil from the second coil, so the back-coupling effect between the magnetic field generated by the first coil and the magnetic field generated by the second coil is reduced; the magnetic field generated by the first coil has a relatively small effect on the magnetic field generated by the second coil, so the magnetic field generated by the second coil is not weakened, thus improving the antenna performance.

Further, the second coil (4) is disposed on the first surface (21) around the center of the first surface (21).

From the above description it can be known that the second coil is surface-mounted on the first surface (21) and is wound from the outer side of the first surface (21) to the inner side of the first surface (21).

Further, the number of turns of each of the first coil (3) and the second coil (4) is greater than two.

From the above description it can be understood that when the number of turns of the first coil (3) and the second coil (4) is greater than two, the antenna achieves better performance. The actual design can be made according to the specific size of an antenna.

Further, the turns ratio of the second coil (4) to the first coil (3) is 0.2:0.4.

From the above description it can be understood that the overall performance of the antenna is involved with the window area of the second coil. Theoretically, the more turns the second coil has, the higher the antenna performance is. However, when the second coil has a relatively large number of turns and a small window area, the antenna performance is degraded, so when the turns ratio of the second coil to the first coil is 0.2:0.4, the antenna has optimal performance.

Further, the first coil (3) is spirally wound on the magnetic core (1) along the length or width direction of the magnetic core (1).

Further, a second dielectric layer (5) and electrodes are also included; the first dielectric layer (2), the magnetic core (1) and the second dielectric layer (5) are superposed in turn; the electrodes are disposed on one side of the second dielectric layer (5) away from the magnetic core (1); the electrodes include a first electrode (61) and a second electrode (62); the tail end of the second coil (4) is electrically connected with the first electrode (61); and the head end of the first coil (3) is electrically connected with the second electrode (62).

From the above it can be understood that the first electrode and the second electrode are provided, and the first coil and the second coil are electrically connected to the external components via the first electrode and the second electrode.

Further, the second dielectric layer (5) is formed with a first through-hole electrode (51) and a second through-hole electrode (52); the tail end of the second coil (4) is electrically connected with the first electrode (61) through the first through-hole electrode (51); and the head end of the first coil (3) is electrically connected with the second electrode (62) through the second through-hole electrode (52).

Figure 8:
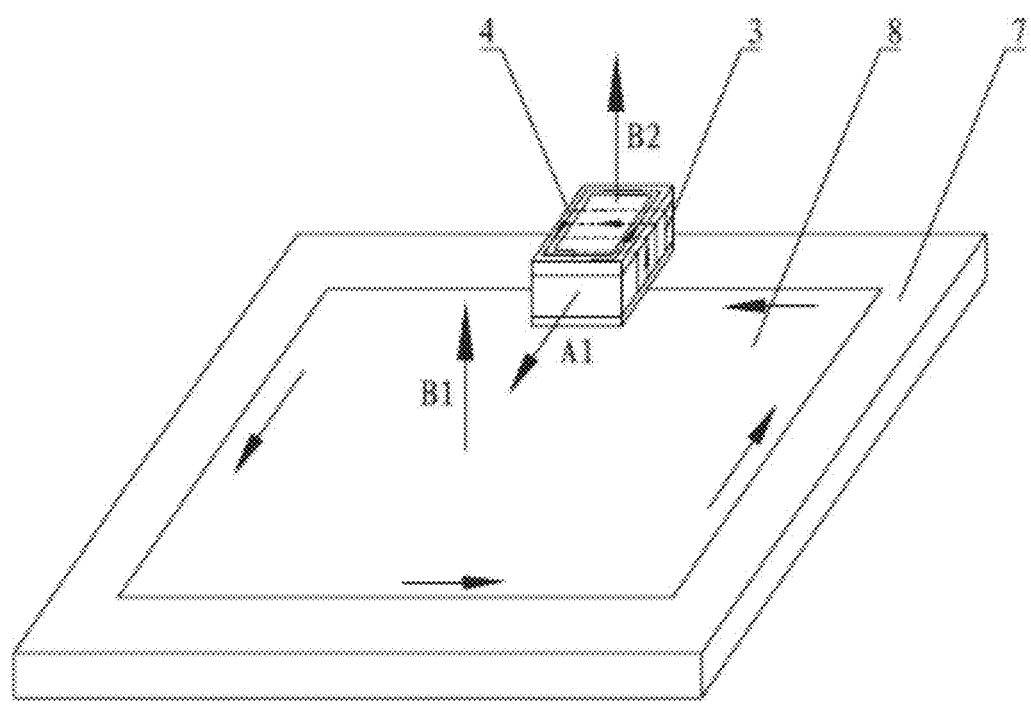
FIG. 8 is a working schematic diagram of an antenna system according to an embodiment of the present invention.
Figure 9:
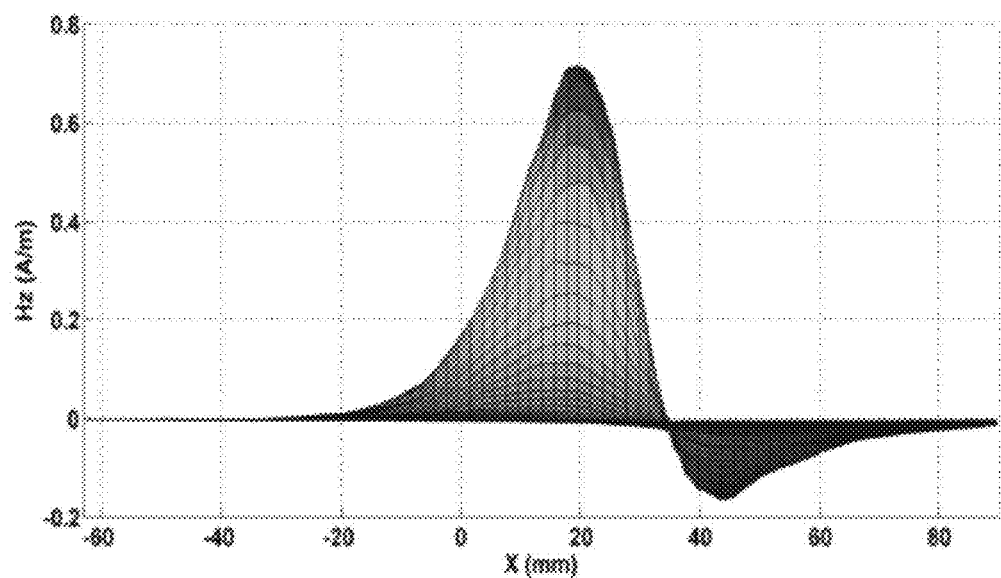
FIG. 9 is a layout of Hz components of a magnetic field of the antenna system at a position 20 mm above the metal sheet in the Z axis direction according to an embodiment of the present invention.
Figure 10:
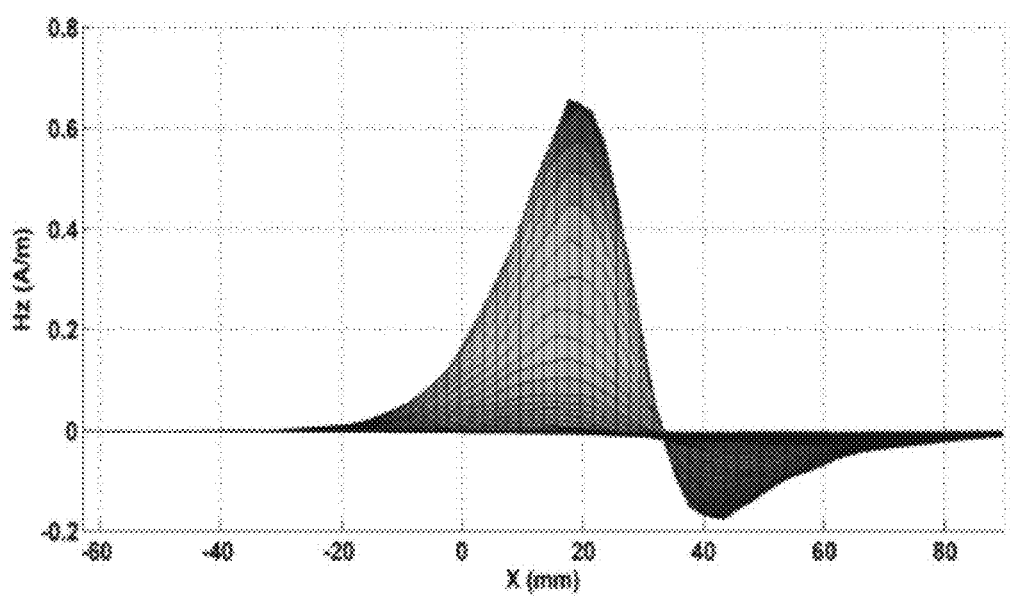
FIG. 10 is a layout of Hz components of a magnetic field at a position 20 mm above the metal sheet in the Z axis direction in the case where the antenna system only has the first coil according to an embodiment of the present invention.

Referring to FIGS. 8-10: An antenna system includes a substrate (7) and a metal sheet (8). The metal sheet (8) is disposed on the substrate (7). The antenna system also includes the aforementioned surface mounted type NFC antenna. The surface mounted type NFC antenna is disposed on the metal sheet (8).

From the above description it can be understood that after the surface mounted type NFC antenna is disposed on the metal sheet, the metal sheet generates an eddy loop due to the existence of the first coil, and the magnetic field generated by the eddy loop on the metal sheet is positively superposed with the magnetic field generated by the second coil, thus improving the performance of the whole antenna system.

Further, the surface mounted type NFC antenna is entirely disposed on the metal sheet (8).

From the above description it can be understood that the surface mounted type NFC antenna is entirely disposed on the metal sheet, and the first coil positioned on the metal sheet is coupled with the metal sheet such that the metal sheet generates the eddy loop, and the magnetic field generated by the eddy loop is superposed with the magnetic field generated by the second coil to improve the overall performance of the antenna.

Further, the surface mounted type NFC antenna is partly disposed on the metal sheet (8).

From the above description it can be understood that the performance of the antenna system depends on the sum of the magnetic field (B1) generated by the first coil and the magnetic field (B2) generated by the second coil. When the first coil is entirely positioned on the metal sheet (or on the inner side), the coupling between the first coil and the metal sheet is strongest, making the eddy loop generate the maximum magnetic field (B1). However, the magnetic field (B2) generated by the second coil is relatively weak in such case because a part of the magnetic field (B2) is isolated by the metal sheet. Therefore, in order to ensure the overall performance of the antenna system, how to maximize the sum of (B1) and (B2) is required to be considered, which means that the first coil is required to be placed on the inner side of the metal sheet by 50-80%.

Referring to FIGS. 1-10: Embodiment 1 of the present invention is as follows:

An antenna system includes a substrate (7), a metal sheet (8) and the aforementioned surface mounted type NFC antenna; the metal sheet (8) is disposed on the substrate (7); and the surface mounted type NFC antenna is disposed on the metal sheet (8).

The surface mounted type NFC antenna includes a magnetic core (1), a first dielectric layer (2), a first coil (3), a second coil (4) and a second dielectric layer (5); the first dielectric layer (2), the magnetic core (1) and the second dielectric layer (5) are superposed in turn.

The first coil (3) is spirally wound on the outer surface of the magnetic core (1) along the circumference of the magnetic core (1), and the first coil (3) is spirally disposed along the length or width direction of the magnetic core (1). One side of the first dielectric layer (2) away from the magnetic core (1) is the first surface (21), and the second coil (4) is spirally wound on the first surface (21) around the center of the first surface (21) along the outer side to the inner side of the first surface (21). The first coil (3) is disposed in a way of being vertical to the second coil (4). The number of turns of each of the first coil (3) and the second coil (4) is one or above. The turns ratio of the second coil (4) to the first coil (3) is 0.2:0.4.

The first coil (3) and the second coil (4) each include a head end and a tail end; and the tail end of the first coil (3) is electrically connected with the head end of the second coil (4).

The second dielectric layer (5) is provided with electrodes on one side away from the magnetic core (1); the electrodes include a first electrode (61) and a second electrode (62); the tail end of the second coil (4) is electrically connected with the first electrode (61); and the head end of the first coil (3) is electrically connected with the second electrode (62).

The second dielectric layer (5) is also provided with a first through-hole electrode (51) and a second through-hole electrode (52); the tail end of the second coil (4) is electrically connected with the first electrode (61) through the first through-hole electrode (51); and the head end of the first coil (3) is electrically connected with the second electrode (62) through the second through-hole electrode (52). The first through-hole electrode (51) is disposed corresponding to the first electrode (61), and the second through-hole electrode (52) is disposed corresponding to the electrode (62).

The magnetic core (1) is a cuboid-structured ferrite, or can be other existing structures, for example square, etc., and the magnetic conductivity of the magnetic core (1) is greater than 100.

As shown in FIG. 1, the cuboid-structured magnetic core (1) consists of a top surface, a bottom surface, a left surface, a right surface, a front surface and a rear surface; the first coil (3) is spirally wound on the magnetic core (1) via the top surface, left surface, bottom surface and right surface in turn; the length direction of the magnetic core (1) is defined as an X axis; the width direction of the magnetic core (1) is defined as a Y axis; and the height direction of the magnetic core (1) is defined as a Z axis. The second coil (4) is wound on the first surface (21) of the first dielectric layer (2). Arrows on the first coil (3) and the second coil (4) in FIGS. 1 and 2, indicate the current directions of the first coil (3) and the second coil (4). When the first coil (3) and the second coil (4) are wound and connected in the aforementioned manner, the first coil (3) generates a horizontal magnetic field component and the second coil (4) generates a vertical magnetic field component.

In this embodiment, the size of the magnetic core (1) is 6 mm (L)×3 mm (W)×0.8 mm (H); the number of turns of the first coil (3) is 13; the number of the turns of the second coil (4) is three; and the thicknesses of the first dielectric layer (2) and the second dielectric layer (5) are each 0.1 mm.

Figure 3:
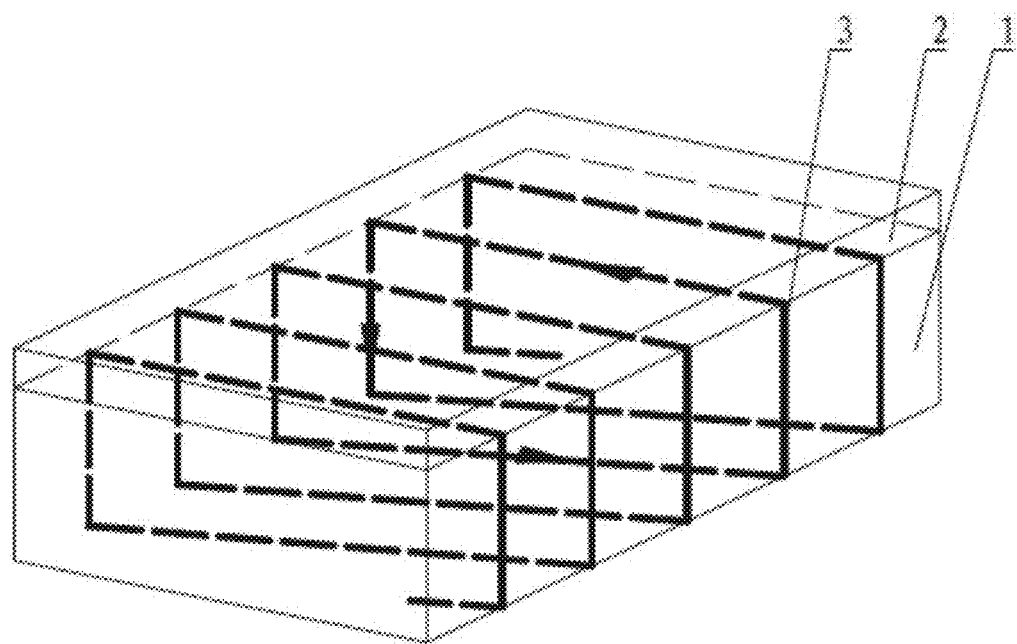
FIG. 3 is a structural view of a surface mounted type NFC antenna only having a first coil according to an embodiment of the present invention.
Figure 4:
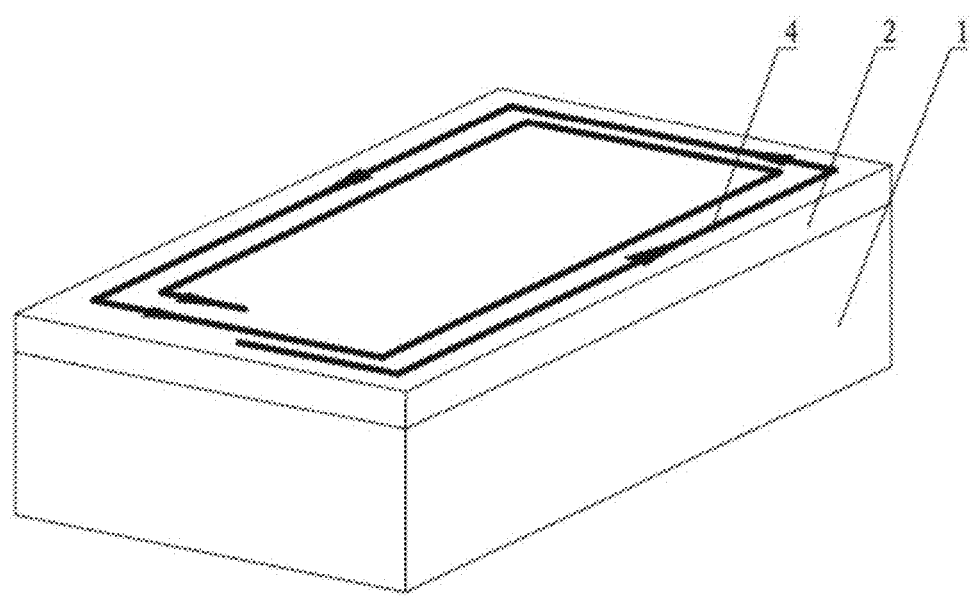
FIG. 4 is a structural view of a surface mounted type NFC antenna only having a second coil according to an embodiment of the present invention.
Figure 5:
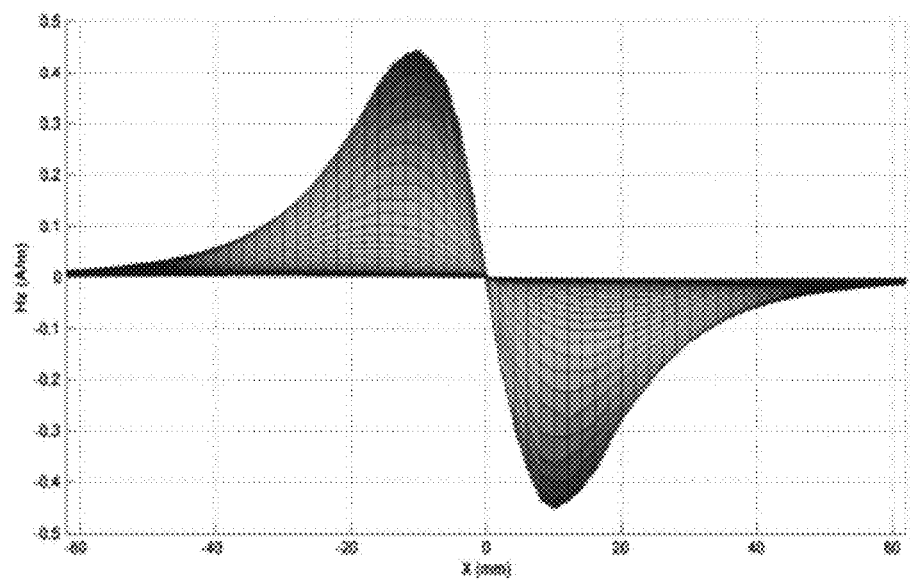
FIG. 5 is a layout of Hz components of a magnetic field at a position 20 mm above a metal sheet in the Z axis direction in the case where the surface mounted type NFC antenna only has the first coil as shown in FIG. 3.
Figure 6:
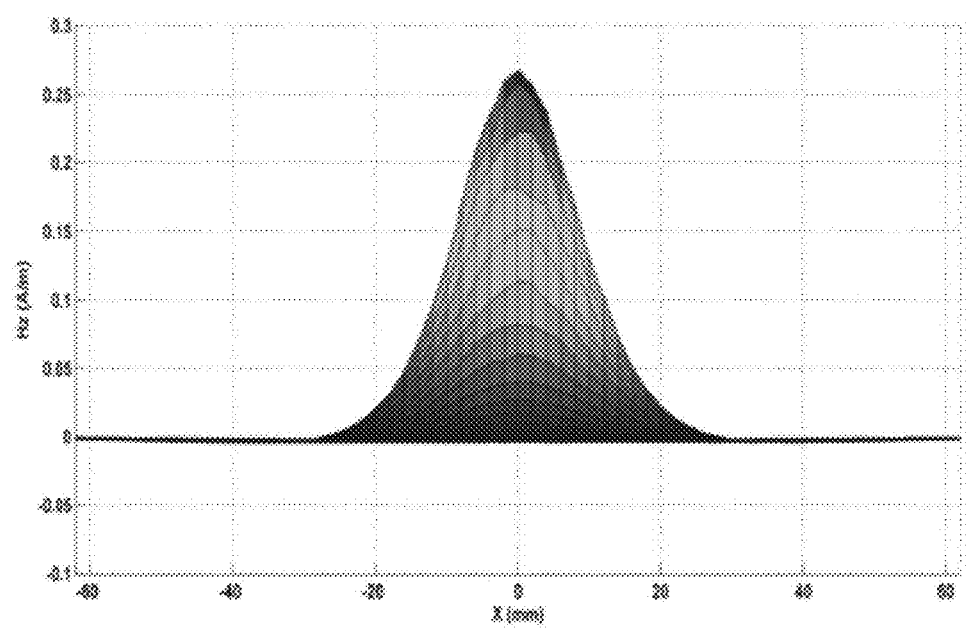
FIG. 6 is a layout of Hz components of a magnetic field at a position 20 mm above a metal sheet in the Z axis direction in the case where the surface mounted type NFC antenna only has the second coil as shown in FIG. 4.
Figure 7:
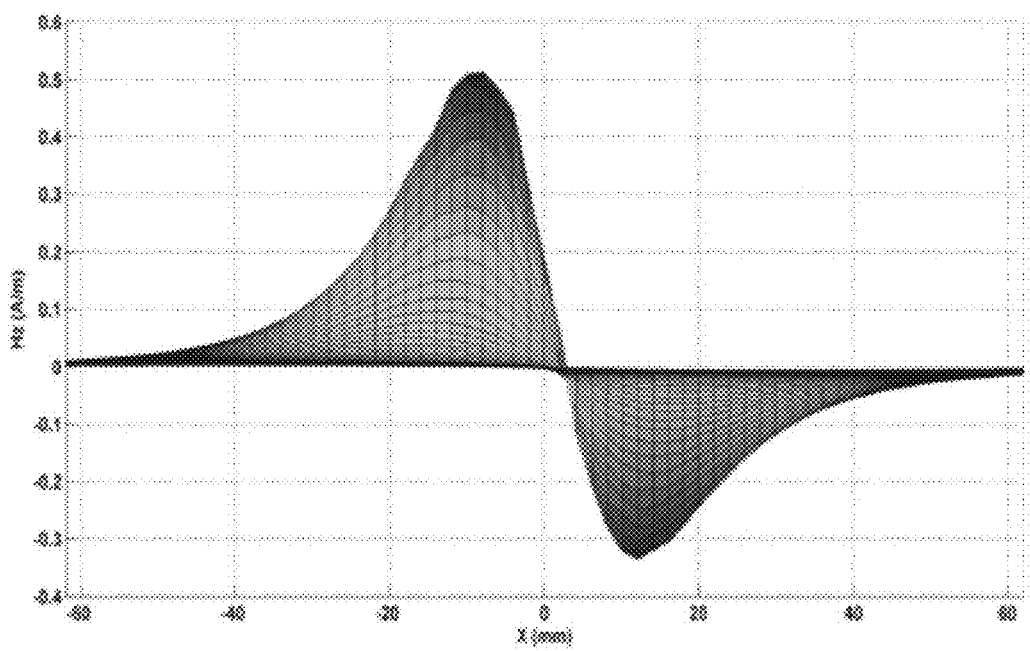
FIG. 7 is a layout of Hz components of a magnetic field of the surface mounted type NFC antenna at a position 20 mm above a metal sheet in the Z axis direction according to an embodiment of the present invention.

As shown in FIG. 5, for the NFC antenna with the first coil (3) only in FIG. 3, the planar magnetic field components of the first coil (3) above the magnetic core (1) constitutes positive and negative modes which are equal in absolute amplitude values (the absolute amplitude values are equal because the structure is symmetrical). As shown in FIG. 6, for the NFC antenna with the second coil (4) only as shown in FIG. 4, the magnetic field components of the second coil (4) constitute one mode with positive amplitude. As shown in FIG. 7, for the NFC antenna having the first coil (3) and the second coil (4) at the same time, the magnetic field components constitute positive and negative modes which are unequal in absolute amplitude values, and the performance of the NFC antenna in the mode with the positive amplitude is higher than that of the NFC antenna in the mode with the negative amplitude. Actually, the reason why the special mode as shown in FIG. 7 is formed is the result of the effective superposition, in space, of the modes with positive and negative amplitudes as shown in FIG. 5 and the mode with the positive amplitude only as shown in FIG. 6. The effective superposition of the magnetic fields in space is just the working principle of the dual ring winding surface mounted type NFC antenna put forward by the present solution.

Besides, the first coil (3) and the second coil (4) are completely separated by the first dielectric layer (2), and the magnetic conductivity of the magnetic core (1) is far greater than that of the first dielectric layer (2), so a large part of the magnetic flow generated by the first coil (3) passes through the magnetic core (1), and only a very small part of the magnetic flow passes the first dielectric layer (2). Then, the back-coupling effect between the magnetic field generated by the first coil (3) and the magnetic field generated by the second coil (4) is relatively small, and the first coil (3) does not weaken the magnetic field component of the second magnetic coil (4), so the magnetic field component of the second coil (4) is relatively large. In such circumstances, during the near field communication process of the surface mounted type NFC antenna, the NFC antenna has good performance when the vertical magnetic field component is relatively large, thus improving the antenna performance.

The second coil (4) is directly disposed on the first dielectric layer (2) to make the processing and manufacturing of the second coil (4) more convenient, thus simplifying the manufacturing process of the whole NFC antenna.

After the surface mounted type NFC antenna is placed on the metal sheet (8) in a manner as shown in FIG. 8, the eddy current which works on the NFC antenna is generated on the metal sheet (8), so the metal sheet (8) becomes the amplifier of the surface mounted type NFC antenna, thus improving the performance of the surface mounted type NFC antenna. The surface mounted type NFC antenna can be placed at any position on the metal sheet (8), but in order to optimize the performance of the antenna system, 50-80% of the surface mounted type NFC antenna shall be disposed on the metal sheet (8) such that the eddy current generated on the metal sheet 8 is strongest. As shown in FIG. 8, the first coil (3) generates a magnetic field component (A1); the second coil (4) generates a magnetic field component (B1); and the eddy loop on the metal sheet (8) generates a magnetic field component (B2). As shown in FIG. 9, by the effective combination of the magnetic field components (B1), (B2) and (A1), the performance of the whole antenna system is improved. By comparing FIG. 9 and FIG. 10, it is known that the antenna system having the first coil (3) and the second coil (4) at the same time has higher performance than the antenna system which only has the first coil (3).

It needs to be pointed out that when the length-width-height ratio of the NFC antenna monomer and the turns of the first coil (3) are fixed, the performance of the NFC antenna increases as the turns of the second coil (4) increase because the magnetic field (B2) generated by the second coil (4) will be strengthened in such situation. When the turns of the second coil (4) increase, the window area of the second coil (4) is also required to be taken into consideration. A relatively small window area of the second coil (4) can cause performance decline to the NFC antenna, so the turns of the second coil (4) cannot be increased infinitely. If the length-width-height ratio of the NFC antenna monomer changes while the turns of the first coil (3) and the second coil (4) are not changed, the improvement on the antenna performance varies with the ratio. For example, when the length-width ratio is relatively small or the height increases, relatively speaking, the magnetic field (B2) generated by the second coil (4) becomes stronger, so a bigger improvement will be made on the antenna system performance. Besides, FIG. 9 and FIG. 10 show the case where the surface mounted type NFC antenna as shown in FIG. 8 is placed on the edge of the metal sheet (8) along the +X direction. As mentioned above, the surface mounted type NFC antenna in the solution is directional, so the surface mounted type NFC antenna is required to be rotated by 180 degrees if placed on other edges of the metal sheet (8), for example on the edge in the −X direction, for the reason that doing so can ensure that the magnetic field generated by the eddy current on the metal sheet (8) and the magnetic field generated by the second coil (4) are in the same direction, thus fulfilling the aim of superposition in the same direction. All in all, it must be ensured that the magnetic field (B1) generated by the eddy current on the metal sheet (8) and the magnetic field (B2) generated by the second coil (4) are in same direction. In order to avoid mistakes in actual use, as in the majority of chips, a mark can be printed in a corner of the upper surface of the surface mounted type NFC antenna.

In conclusion, the present invention provides a surface mounted type NFC antenna, wherein the second coil is disposed on the dielectric layer to separate the first coil from the second coil, capable of preventing the magnetic field generated by the first coil from weakening the magnetic field generated by the second coil and ensuring that the magnetic field generated by the second coil is relatively large, so the NFC antenna has a small size and good performance.

The above are only some embodiments of the present invention and shall not be regarded as limits to the present invention. Any equivalent modifications made on the basis of the description and attached drawings of the present invention, or direct or indirect application to the related fields, shall fall within the protective scope of the present invention.

What is claimed is:

1. A surface mounted type NFC antenna, comprising:
    a magnetic core,
    a first dielectric layer,
    a first coil and a second coil, wherein
        the first dielectric layer and the magnetic core are superposed;
        the first coil is wound on the outer surface of the magnetic core;
        one side of the first dielectric layer away from the magnetic core is a first surface;
        the second coil is disposed on the first surface;
        the first coil and the second coil each comprise a head end and a tail end;
        the tail end of the first coil is electrically connected with the head end of the second coil;
        the first coil and the second coil are completely separated by the first dielectric layer; and
        the first coil and the second coil substantially overlap each other when viewed from a height direction of the first dielectric layer.

2. The surface mounted type NFC antenna according to claim 1, wherein the second coil is disposed on the first surface around the center of the first surface.

3. The surface mounted type NFC antenna according to claim 1, wherein the number of turns of each of the first coil and the second coil is greater than two.

4. The surface mounted type NFC antenna according to claim 1, wherein the turns ratio of the second coil to the first coil is 0.2:0.4.

5. The surface mounted type NFC antenna according to claim 1, wherein the first coil is spirally wound on the magnetic core along the length or width direction of the magnetic core.

6. The surface mounted type NFC antenna according to claim 1, further comprising a second dielectric layer and electrodes, wherein the first dielectric layer, the magnetic core and the second dielectric layer are superposed in turn; the electrodes are disposed on one side of the second dielectric layer away from the magnetic core; the electrodes include a first electrode and a second electrode; the tail end of the second coil is electrically connected with the first electrode; and the head end of the first coil is electrically connected with the second electrode.

7. The surface mounted type NFC antenna according to claim 6, wherein the second dielectric layer is provided with a first through-hole electrode and a second through-hole electrode; the tail end of the second coil is electrically connected with the first electrode through the first through-hole electrode; and the head end of the first coil is electrically connected with the second electrode through the second through-hole electrode.

8. An antenna system, comprising a substrate and a metal sheet, the metal sheet being disposed on the substrate, the antenna system also comprising a surface mounted type NFC antenna according to claim 1, wherein the surface mounted type NFC antenna is disposed on the metal sheet.

9. The antenna system according to claim 8, wherein the surface mounted type NFC antenna is entirely disposed on the metal sheet.

10. The antenna system according to claim 8, wherein the surface mounted type NFC antenna is partly disposed on the metal sheet.

11. The antenna system according to claim 10, wherein 50-80% of the surface mounted type NFC antenna is disposed on the metal sheet.

* * * * *